United States Patent
Smith

(10) Patent No.: US 7,555,775 B2
(45) Date of Patent: *Jun. 30, 2009

(54) RECOVERING FROM DEVICE FAILURE

(75) Inventor: Frederick J. Smith, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 869 days.

This patent is subject to a terminal disclaimer.

(21) Appl. No.: 11/058,530

(22) Filed: Feb. 14, 2005

(65) Prior Publication Data

US 2005/0144442 A1 Jun. 30, 2005

Related U.S. Application Data

(63) Continuation of application No. 10/185,493, filed on Jun. 28, 2002, now Pat. No. 6,886,112.

(51) Int. Cl.
*G06F 11/00* (2006.01)
*H04L 9/32* (2006.01)

(52) U.S. Cl. .............................. 726/22; 726/26; 713/190

(58) Field of Classification Search ......... 713/189–194, 713/2; 726/22–23, 26; 714/38; 719/323
See application file for complete search history.

(56) References Cited

U.S. PATENT DOCUMENTS

| 5,526,485 | A | 6/1996 | Brodsky |
| 5,687,376 | A | 11/1997 | Celi |
| 6,141,757 | A | 10/2000 | Seeker |
| 6,584,508 | B1 | 6/2003 | Epstein |
| 6,829,772 | B2 | 12/2004 | Foote |
| 6,973,643 | B2 | 12/2005 | Goldsmith |
| 7,024,555 | B2 * | 4/2006 | Kozuch et al. ................. 726/22 |
| 7,124,403 | B2 | 10/2006 | Price |
| 7,171,672 | B2 | 1/2007 | Just |

OTHER PUBLICATIONS

Spurgat, Jeff; "Writing Windows CE Display Drivers"; Dr. Dobb's Journal, vol. 25, No. 9, pp. 76, 78-80, 82, 84.
Awaga, Makoto; Ohtsuka, Tatsushi; Yoshizawa, Hideaki; Sasaki, Shigeru; "3D Graphics Processor Chip Set"; IEEE Micro, vol. 15, No. 6, pp. 37-45.
Notice of Allowance dated Jan. 6, 2005 cited in U.S. Appl. No. 10/185,493 (Copy Attached).

* cited by examiner

*Primary Examiner*—Hosuk Song
(74) *Attorney, Agent, or Firm*—Workman Nydegger

(57) ABSTRACT

In some techniques for resource recovery, a region of code can be considered untrusted. To catch problems in the untrusted region, entry points are wrapped with exception logic for processing exceptions raised within the untrusted region. Until an exception has been raised within the untrusted region, instructions corresponding to the entry points may be executed. However, once an exception has been raised within the untrusted region, further access to the untrusted code is prevented. A time element may be recorded for indicating execution time within an untrusted display hardware driver. Once a threshold execution time is reached, indicating a graphics processor hang, driver execution stops and an exception raised. When execution continues, the exception is processed based on the exception logic. Updating the display hardware then occurs without using the graphics processor. The display hardware may notify a user that the graphic processor is not functioning.

21 Claims, 7 Drawing Sheets

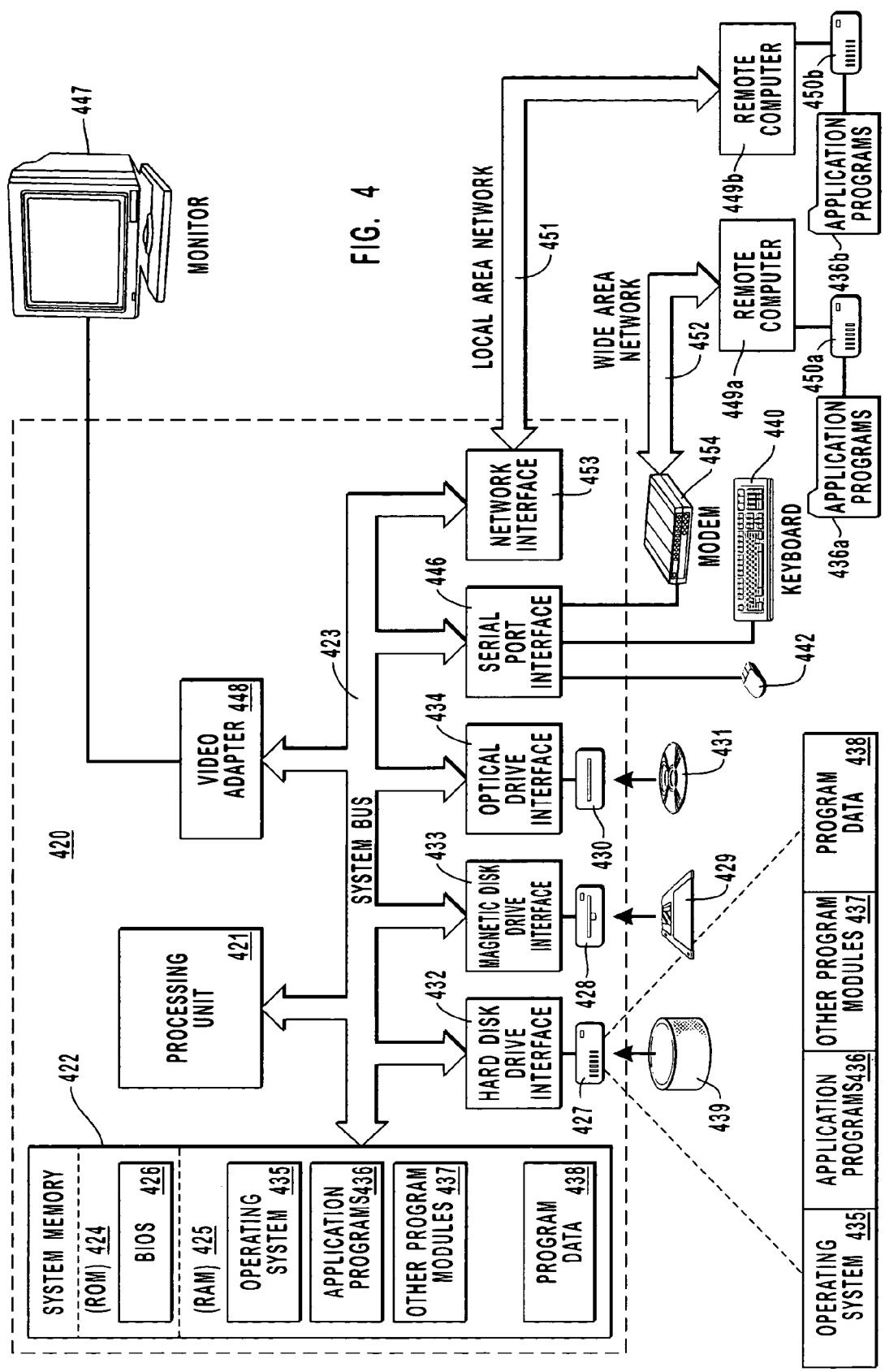

RECOVERING FROM DEVICE FAILURE

CROSS-REFERENCE TO RELATED APPLICATIONS

The present application is a continuation application of commonly-assigned U.S. patent application Ser. No. 10/185,493 filed Jun. 28, 2002, entitled "Recovering from Device Failure", and which is incorporated herein by reference.

BACKGROUND OF THE INVENTION

1. The Field of the Invention

The present invention relates to the field of device failure recovery for computer software. Specifically, the present invention relates to methods, systems, and computer program products for resource recovery from an untrusted region of computer executable instructions that permits continued execution of computer instructions in a trusted region without encountering potential inconsistencies introduced by recovering the resource from the untrusted region.

2. Background and Relevant Art

Computer display hardware is becoming increasing powerful. Although it has not always been the case, nearly all computer display hardware for graphical displays includes a graphics processor optimized for performing graphics instructions or commands. A graphics processor provides two primary benefits. First, because graphics instructions generally include a command (e.g., draw a polygon, draw a circle, etc.) with certain parameters (e.g., size, location, etc.) rather than information for drawing individual display pixels, less information needs to be transferred to the display hardware. Second, the graphics processor performs a significant amount of processing that otherwise would be performed by a computer's central processing unit ("CPU").

Various layers of computer software typically are involved in controlling display hardware, including applications, operating systems, and device drivers. Device drivers generally implement abstract operating system calls for specific display hardware. Accordingly, an operating system uses the device driver for all hardware specific operations. In many cases, the interaction between the device driver and the display hardware is asynchronous, essentially meaning that the device driver asks the display hardware to perform some operation and then checks back later to see if the operation has been completed. Occasionally, a graphics processor will "hang" so that no commands are being processed.

When a graphics processor hangs, it appears as if the entire computer system hangs because no display updates occur. In some circumstances, however, the majority of the computer system, (e.g., applications, operating system, display, CPU, etc.) are all operating, but waiting for the graphics processor to complete a particular operation. The device driver is functioning—constantly asking if the graphics processor has completed a requested operation—but not performing any useful task.

One possible solution is to terminate the thread which is stuck in the driver. As suggested above, the rest of the computer system likely is functioning properly, but no display updates occur. However, terminating the stuck thread may cause more problems than it solves. In particular, terminating the thread may cause inconsistencies in the operating system. To appreciate why, it is helpful to understand that many operating systems provide at least two process modes: (i) a relatively less trusted and therefore more restricted user mode, and (ii) a relatively more trusted and therefore less restricted kernel mode.

Generally, application processes run within user mode so that the processes are isolated and cannot interfere with each other's resources. User processes switch to kernel mode when interacting with the operating system, such as when making system calls, generating an exception or fault, or when an interrupt occurs, etc. Processes running in kernel mode are privileged and have access to all computer resources (such as all available memory), without the restrictions that apply to user mode processes. When a graphics processor hangs, the process/thread executing the device driver is in kernel mode.

In many cases, a thread in kernel mode may have acquired resources, such as locks for exclusive use, mutexes and semaphores for synchronization, memory, etc. Furthermore, kernel mode processes tend to update sensitive memory structures that are expected to be consistent when an update is completed. For example, a kernel mode process may lock a resource, perform various updates to the resource that cumulatively leave the resource in a consistent state, and unlock the resource when finished. In arbitrarily terminating a kernel mode thread, locks may be left in place, resources may remain allocated, and resources that have not been fully updated may be left in an inconsistent state. Accordingly, methods, systems, and computer program products that allow for resource recovery that permit continued execution of computer instructions without encountering potential inconsistencies introduced by recovering the resource are desired.

BRIEF SUMMARY OF THE INVENTION

The present invention relates to methods, systems, and computer program products for resource recovery from an untrusted region of computer executable instructions that permits continued execution of computer instructions in a trusted region without encountering potential inconsistencies introduced by recovering the resource. One or more entry points for the untrusted region are wrapped with exception logic for processing one or more exceptions that may be raised within the untrusted region. Upon determining that no exception has been raised within the untrusted region, computer instructions that correspond to any of the one or more untrusted region entry points may be executed. However, once an exception has been raised within the untrusted region, resources are prevented from entering.

A time element may be recorded that indicates at least an approximate execution time for the computer executable instructions of an untrusted display hardware driver. Upon determining that a threshold execution time for the time element is reached, indicating a graphics processor hang, driver execution stops and an exception is raised. When driver execution continues, the exception is processed based on the corresponding exception logic. Updating the display hardware then occurs without using the graphics processor. The display hardware may be used to indicate that the graphic processor is not functioning, that the user should save work in progress, and/or that the computer system should be restarted.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered as limiting its scope, the invention will be described and explained with additional specificity and detail through the use of the accompanying drawings in which:

FIG. 4 illustrates an example system that provides a suitable operating environment for the present invention.

DETAILED DESCRIPTION OF THE PREFERRED EMBODIMENTS

The present invention relates to methods, systems, and computer program products for resource recovery from an untrusted region of computer executable instructions that permits continued execution of computer instructions in a trusted region without encountering potential inconsistencies introduced by recovering the resource. Embodiments of the present invention may comprise one or more special purpose and/or one or more general purpose computers including various computer hardware, as discussed in greater detail below with respect to FIG. 4.

Figure 1A:
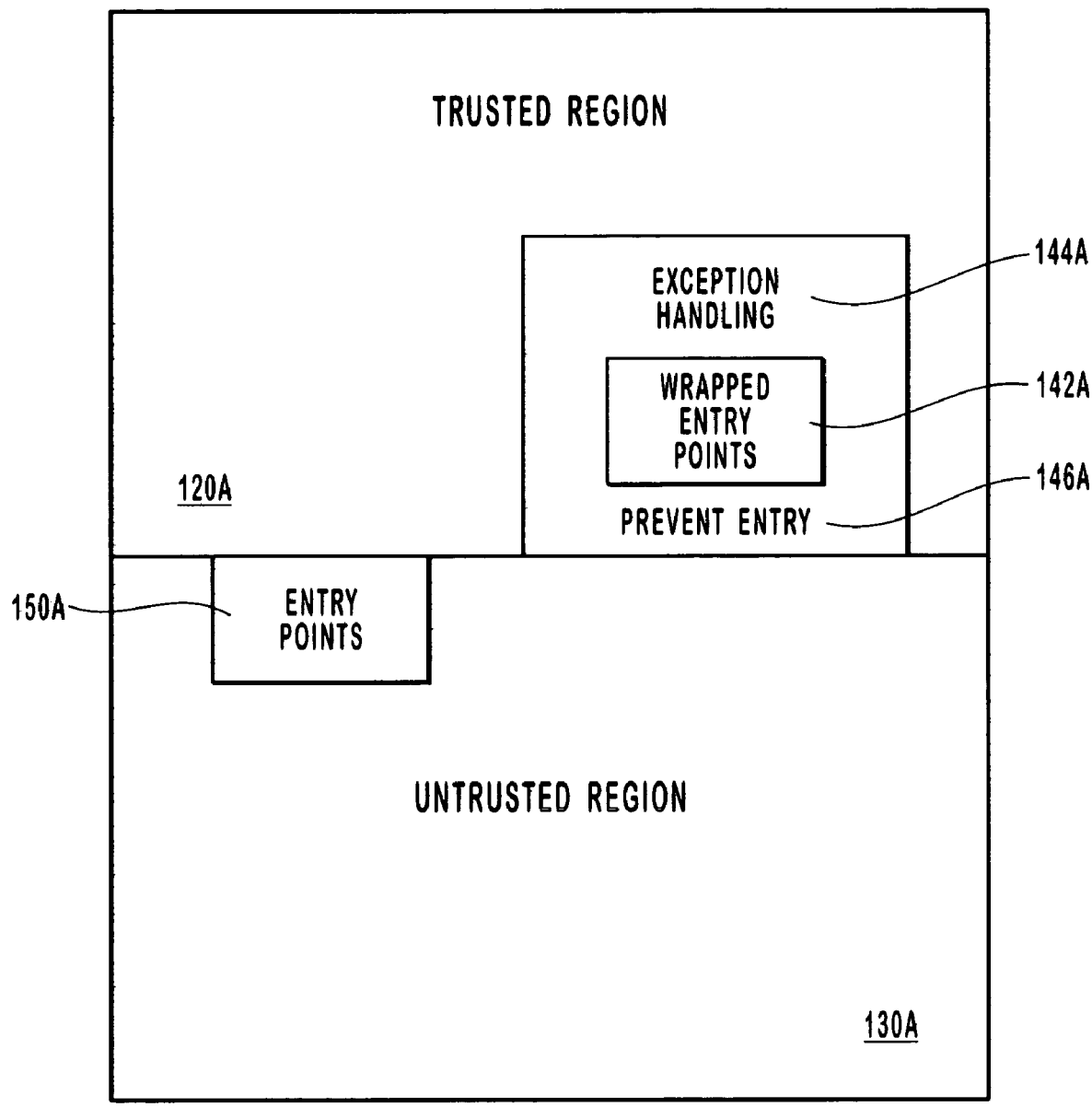
FIGS. 1A and 1B are high-level block diagrams showing example implementations for resource recovery in accordance with the present invention.
Figure 1B:
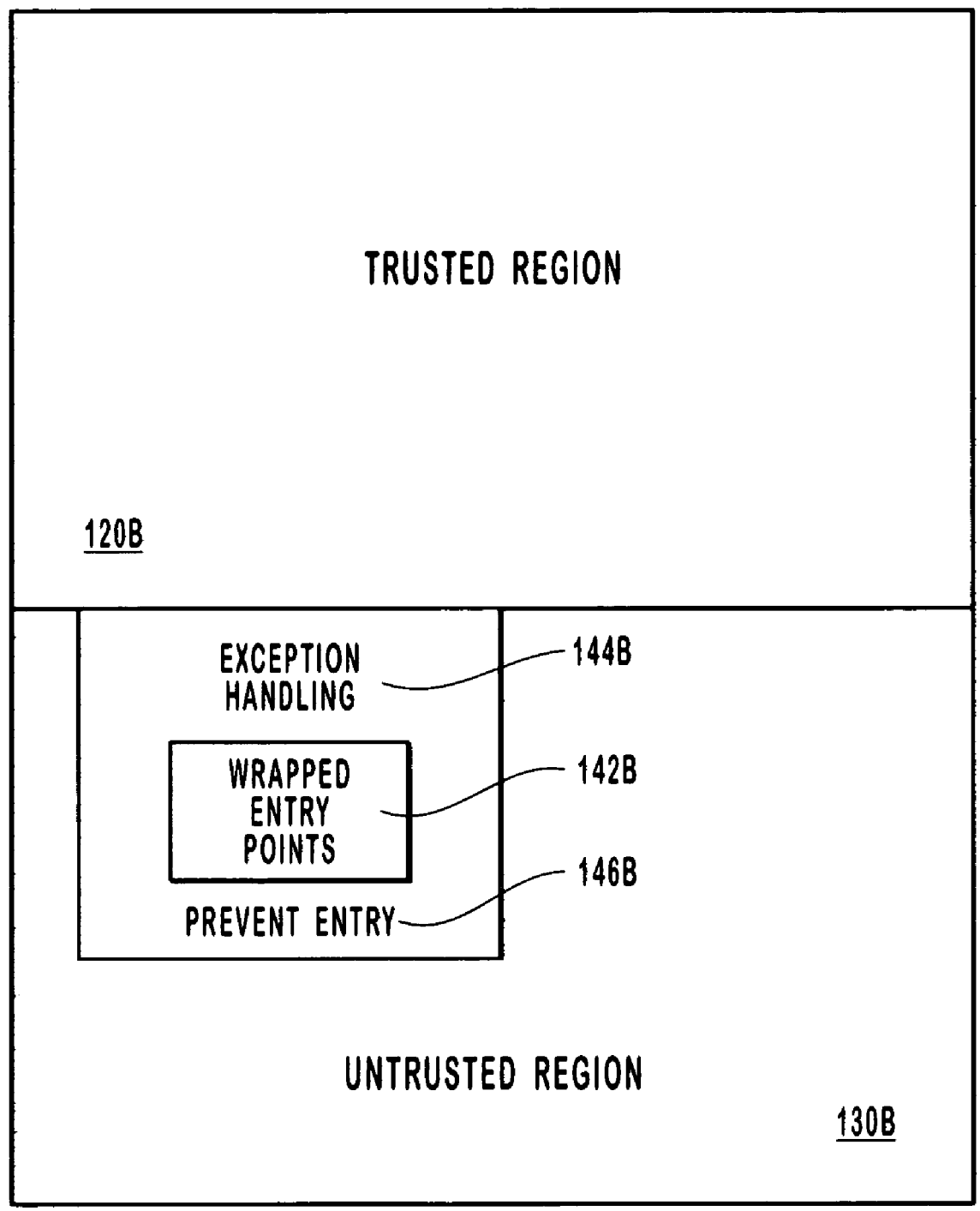

FIGS. 1A and 1B are high-level block diagrams showing example implementations for resource recovery in accordance with the present invention. Trusted region 120A is a region of trusted computer executable instructions. Untrusted region 130A is a region of untrusted computer executable instructions. In a broad sense, trusted versus untrusted is simply a matter of labeling so that the two regions can be distinguished when being described. As such, the division between a trusted region and an untrusted region may be arbitrary, and may be drawn by practicing the present invention.

The distinction between trusted and untrusted also may reflect a relationship between the two regions. For example, a trusted region (such as an operating system) may make use of untrusted routines (such as those provided by a device driver), which may become unstable due to inconsistencies from recovering a resource (such as a thread) in the untrusted region. Accordingly, untrusted region 130A may correspond to computer executable instructions from a third party. The term trusted also may indicate that a region (such as trusted region 120A) is protected from corruption and/or hanging, with the term untrusted indicating that a region (such as untrusted region 130A) is unprotected.

Trusted region 120A includes wrapped entry point 142A, exception handling 144A, and prevent entry logic 146A. Untrusted region 130A includes entry points 150A. Entry points 150A for untrusted region 130A may be wrapped (142A) using any of a number of techniques. In FIG. 1A, a table of the entry points for untrusted region 130A is replaced with wrapped entry points 142A. In this way, exception handling 144A and prevent entry logic 146A may be added to the entry points without having to modify the entry points themselves or every call to the entry points. The wrapped entry points 142A then call the entry points 150A to access untrusted region 130A. Because a single trusted region 120A may serve multiple untrusted regions 130A, context (which of one or more untrusted region is desired) may need to be determined from available parameters for a given entry point and/or determined from other information.

Alternatively, entry points into untrusted region 130A may be wrapped each time they are called within trusted region 120A. This approach is less likely to suffer from problems with determining context (because the wrapping occurs at a higher level), but results in duplicating the exception handling 144A and the prevent entry logic 146A many times over. Furthermore, for existing trusted code, wrapping each entry point call may require significantly more changes than would be required for replacing a table of entry points as described above.

In FIG. 1B, untrusted region 130B includes wrapped entry points 142B, exception handling 144B, and prevent entry logic 146B. No changes whatsoever are required in trusted region 120B because trusted region 120B calls wrapped entry points 142B for all access to untrusted region 130B. Although context information is less likely to be available at this level, it is also less likely to be needed because the untrusted region 130B is responsible for the interface and can determine what information is needed to operate properly. Many other implementations are possible and should be considered to fall within the scope of the appended claims.

Figure 2A:
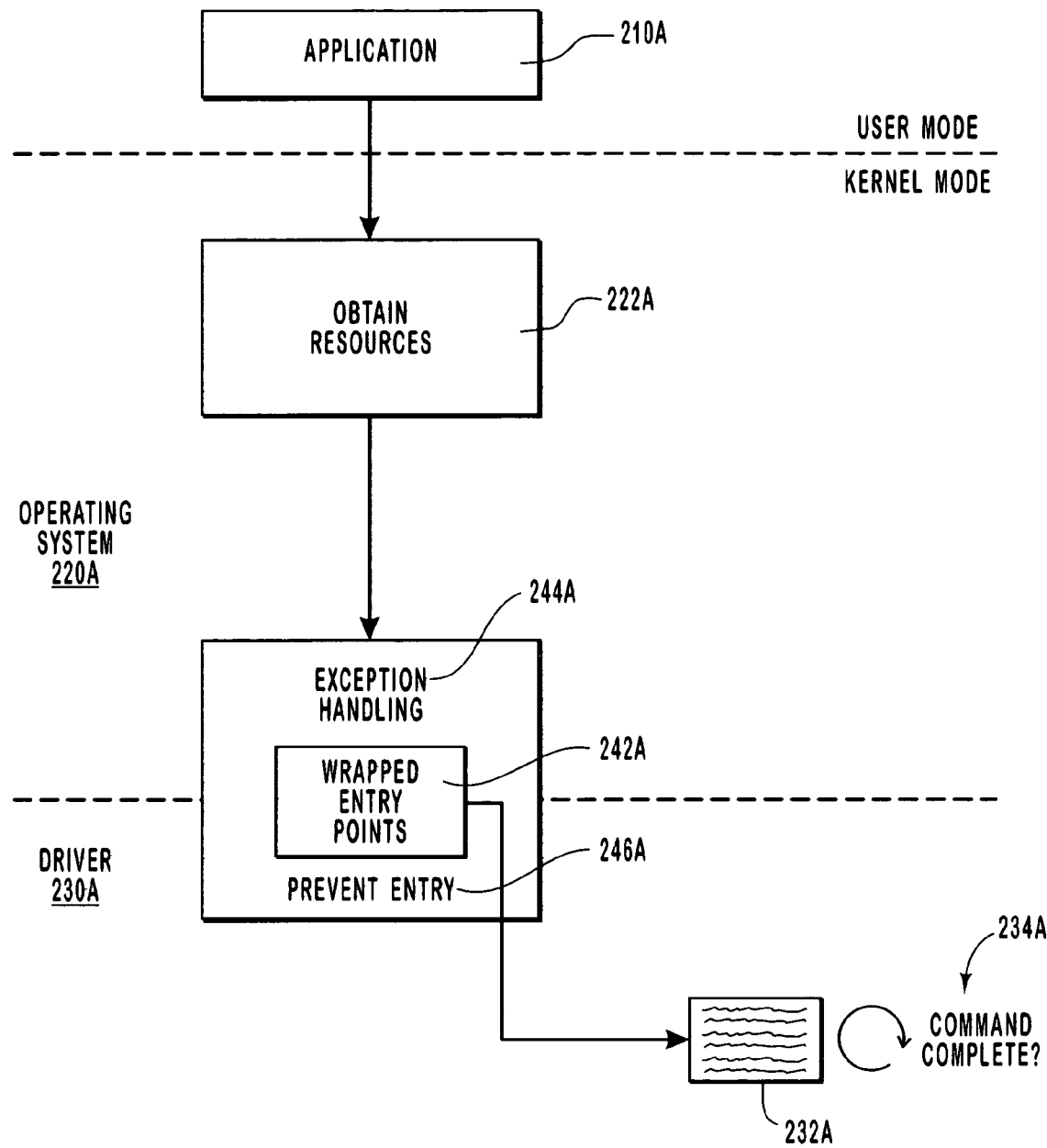
FIGS. 2A and 2B are block diagrams illustrating a resource recovery example for a device driver.
Figure 2B:
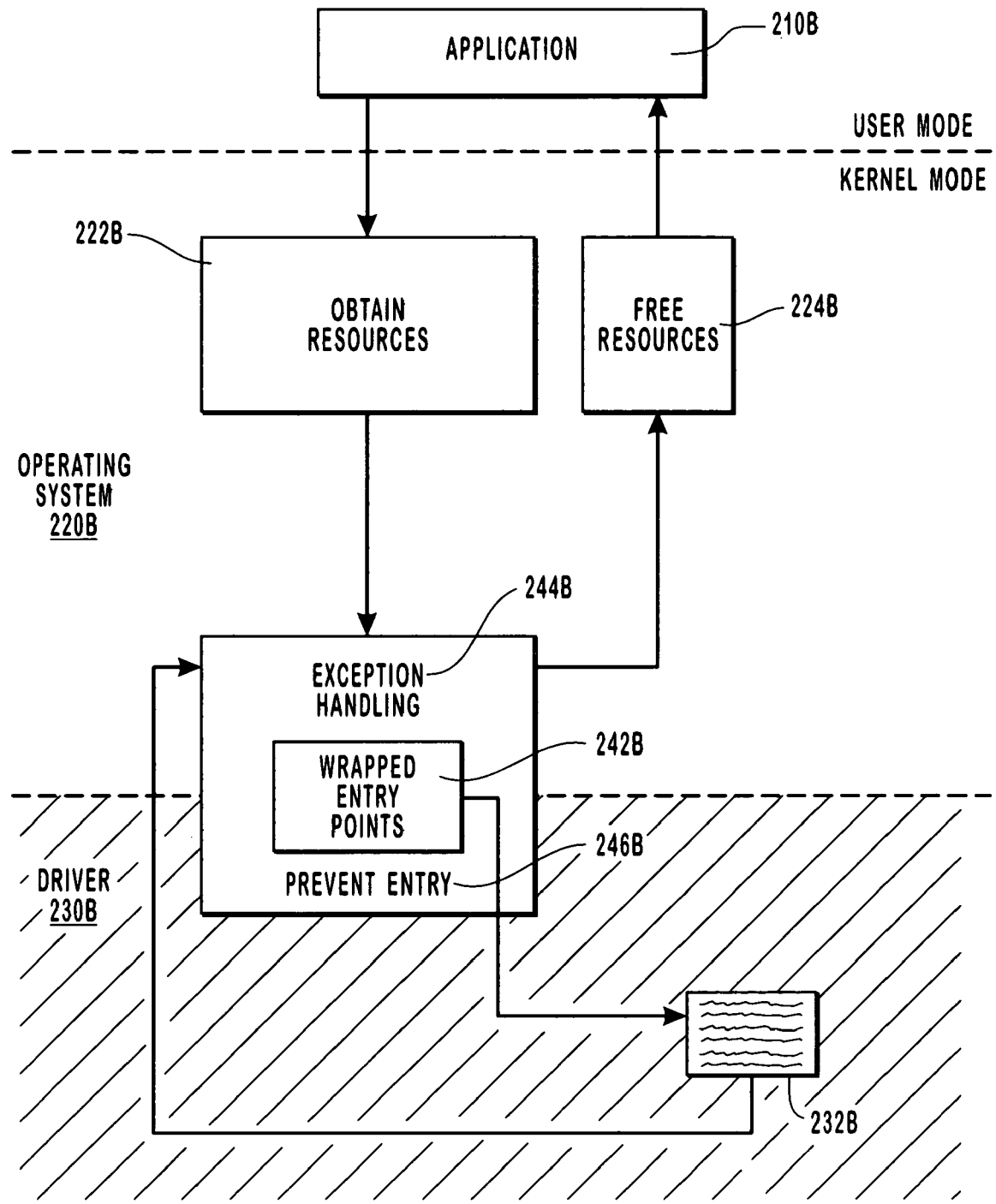

FIGS. 2A and 2B are block diagrams illustrating a resource recovery example for a device driver. (In FIGS. 2A and 2B, similar elements are numbered similarly, with either an "A" suffix or a "B" suffix, depending on the Figure being referenced.) Application 210A operates in user mode and makes calls to the operating system 220A, which in turns calls driver 230A when needed. In calling operating system 220A, an application thread transitions to kernel mode and obtains resources 222A (e.g., memory, semaphores, mutexes, other locks, etc.) prior to calling any wrapped entry points 242A for driver 230A. (The dashed line separating operating system 220A and driver 230A splits wrapped entry points 242A, exception handling 244A, and prevent entry 246A to emphasis that any wrapping technique may be used, even though this particular example replaces a table of entry points returned by driver 230A, similar to the table replacement description in connection with FIG. 1A, above.)

At obtain resources 222A, a time element is associated with the application thread to track CPU time. Alternatively, the time element could be associated with the thread at wrapped entry points 242B or at any other time capable of providing a relatively accurate reflection of the CPU time expended by the application thread within driver 230A. After calling a wrapped entry point, computer executable instructions 232A are executed. In this example, one or more of the instructions rely on a graphics processor (which is part of the display hardware for a computer system) for processing. Periodically, driver 230A checks 234A if the graphics processor has completed the instructions, but for some reason, the graphic processor hangs and is unable to process the instructions. Accordingly, driver 230A accomplishes little more than spinning. (Typically, only one thread enters the driver at a time.) Display updates cease while waiting for the graphics processor, and from a user's perspective, the computer system hangs, although it may be that only display updates have ceased.

Turning next to FIG. 2B, from time to time, another thread examines the time element associated with the application thread and compares it with a threshold time. When the threshold (usually an inordinately long time) is reached, the application thread is presumed to be stuck in driver 230B and an asynchronous procedure call ("APC") is issued to the application thread. (Because the APC is processed before running the thread scheduler, it has the effect of blocking further thread execution while being processed.) The APC gets the application thread's context, performs a final check to see if the application thread remains in the driver, sets the thread's context by setting the thread instruction pointer to a routine that raises an exception, and returns.

When the application thread begins executing, the exception is raised and no further attempts are made to execute instructions 232B. Exception handling 244B performs the appropriate exception handling for the wrapped entry points 242B. For example, appropriate return values could be returned to the caller and prevent entry logic 246B may be activated so that no other threads attempt to enter driver 230B, which as a result of the exception, may be in an inconsistent state (indicated by the shading in FIG. 2B). In one example embodiment, prevent entry logic 246B includes a flag that may be checked within wrapped entry points 242B, or at other locations, prior to entering driver 230B. In another embodiment, prevent entry logic 246B replaces the table of wrapped entry points with other functions that do not access driver 230B.

The application thread returns to the operating system 220B to free resources 224B (from obtain resources 222B) and perform any other desired cleanup for the thread. For example, it may also be desirable to perform some cleanup on behalf of the untrusted driver 230B. (It should be noted that if the thread had been terminated while in driver 230B, free resources 224B and other cleanup would not occur and the operating system potentially would be in an inconsistent state.) After free resources 224B, the application thread returns to the application 210B. The exception handling 244B also might include setting the display hardware to a mode that uses the computer system's processor for graphics instructions rather than the graphics processor.

Although using the computer system's processor for graphics instructions likely will result in poor performance, in this mode the display can be updated. As a result, the display can be used to indicate that the graphics processor is not functioning and that the computer system should be restarted. This gives the user an opportunity to save existing work prior to restarting. Of course the present invention is not necessarily limited to exceptions based on CPU time, but includes other types of exceptions, including those generated by hardware, such as access violations, divide by zero, as well as other software generated exceptions.

The present invention also may be described in terms of methods comprising functional steps and/or non-functional acts. The following is a description of acts and steps that may be performed in practicing the present invention. Usually, functional steps describe the invention in terms of results that are accomplished, whereas non-functional acts describe more specific actions for achieving a particular result. Although the functional steps and non-functional acts may be described or claimed in a particular order, the present invention is not necessarily limited to any particular ordering or combination of acts and/or steps.

Figure 3A:
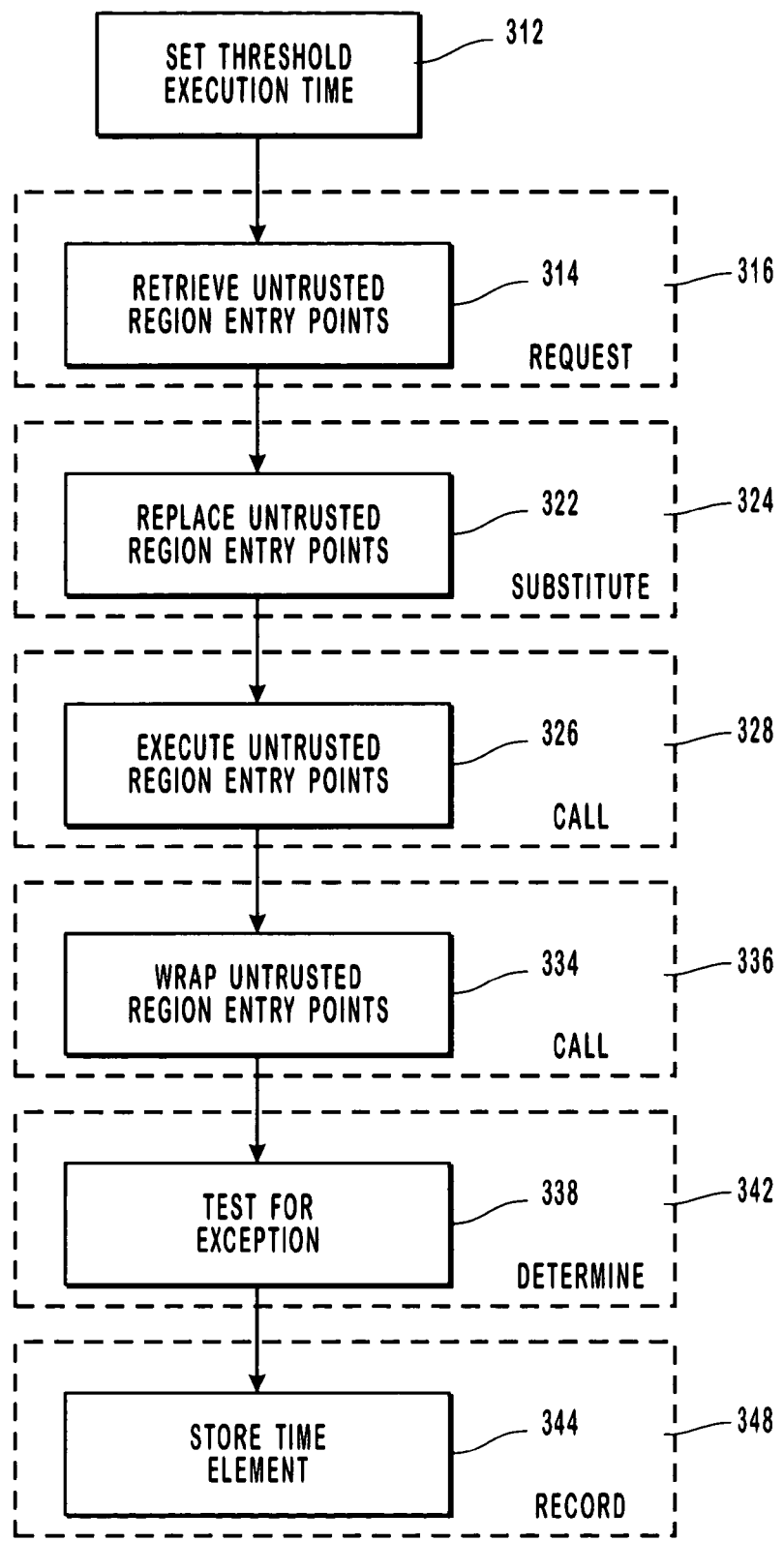
FIGS. 3A and 3B show example acts and steps for methods of resource recovery in accordance with the present invention.
Figure 3B:
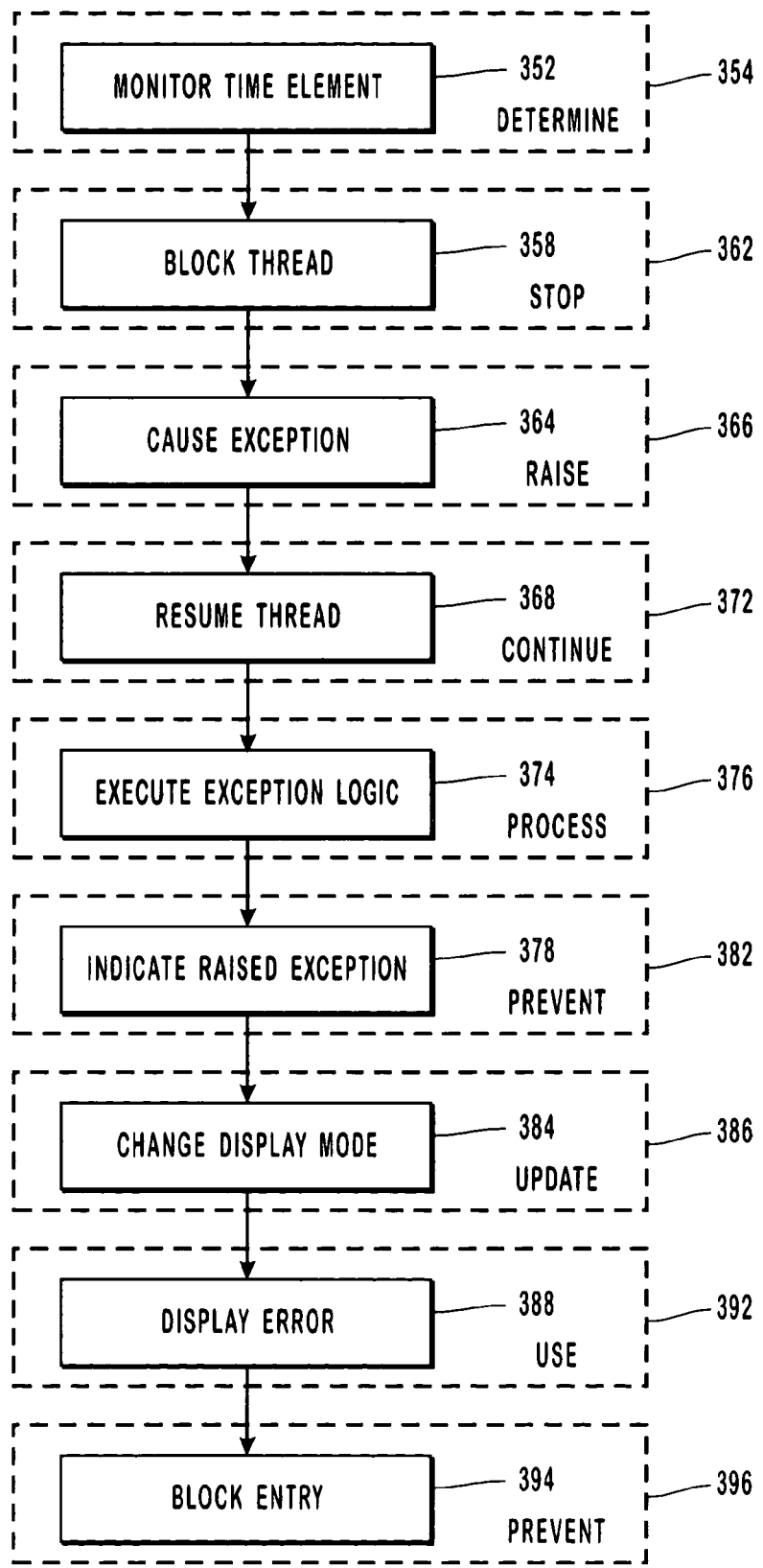

FIGS. 3A and 3B show example acts and steps for methods of resource recovery in accordance with the present invention. The present invention may include an act of setting (312) a threshold execution time for a time element. A step for requesting (316) one or more untrusted region entry points from a display hardware driver may include an act of retrieving (314) one or more untrusted region entry points from the display hardware driver. A step for substituting (324) wrapped one or more untrusted region entry points for one or more untrusted region entry points may include an act of replacing (322) one or more untrusted region entry points with the wrapped one or more untrusted region entry points. A step for calling (328) the one or more untrusted region entry points from the wrapped one or more untrusted region entry points may include an act of executing (326) the one or more untrusted region entry points from the wrapped one or more untrusted region entry points.

A step for calling (336) one or more untrusted region entry points may include an act of wrapping (334) the one or more untrusted region entry points. A step for determining (342) whether an exception has been raised may include an act of testing (338) whether an exception has been raised. A step for recording (348) a time element may include an act of storing (344) the time element. A step for determining (354) if the threshold execution time has been reached may include an act of monitoring (352) the time element. In one embodiment, the time element and threshold execution time are based on central processing unit execution time.

A step for stopping (362) thread execution may include an act of blocking (358) the thread. A step for raising (366) a particular exception within the thread may include an act of causing (364) the particular exception to be raised. A step for continuing (372) thread execution may include an act of resuming (368) execution of the thread. A step for processing (376) the particular exception may include an act of executing (374) the exception logic.

A step for preventing (382) other threads from entering the untrusted region may include an act of indicating (378) that the particular exception has been raised. A step for updating (386) the display hardware without using the graphics processor may include an act of changing (384) display modes to allow the CPU to update the display hardware. A step for using (392) the display hardware to indicate that the graphics processor is not functioning may include an act of displaying (388) an error message. An act of preventing (396) one or more resources from entering the untrusted region may include an act of blocking (394) one or more resources from entering the untrusted region once an exception is raised in the untrusted reason.

In one embodiment, for example, an untrusted entry point is retrieved for an untrusted region of code. A wrapper for the untrusted entry point is created and passed to the client of the untrusted code. At a future time, the client calls into the untrusted region via the wrapped entry point. (The thread's CPU time may be checked and stored at this point.) An exception handler is setup in the wrapper and the wrapper calls into the untrusted code (via the original entry point retrieved for the untrusted region). When control returns to the wrapper from the untrusted code, it is either due to returning normally or because an exception occurred. For example, a separate worker thread monitor's the thread's CPU time to determine if the thread is stuck in the untrusted region and will inject an exception into the thread based on a threshold CPU execution time.

FIG. 4 illustrates an example system that provides a suitable operating environment for practicing the present invention. As indicated above, embodiments of the present invention may comprise one or more special purpose and/or one or more general purpose computers including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disc storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 4 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 4, an exemplary system for implementing the invention includes a general purpose computing device in the form of a conventional computer 420, including a processing unit 421, a system memory 422, and a system bus 423 that couples various system components including the system memory 422 to the processing unit 421. The system bus 423 may be any of several types of bus structures including a memory bus or memory controller, a peripheral bus, and a local bus using any of a variety of bus architectures. The system memory includes read only memory (ROM) 424 and random access memory (RAM) 425. A basic input/output system (BIOS) 426, containing the basic routines that help transfer information between elements within the computer 420, such as during start-up, may be stored in ROM 424.

The computer 420 may also include a magnetic hard disk drive 427 for reading from and writing to a magnetic hard disk 439, a magnetic disk drive 428 for reading from or writing to a removable magnetic disk 429, and an optical disc drive 430 for reading from or writing to removable optical disc 431 such as a CD-ROM or other optical media. The magnetic hard disk drive 427, magnetic disk drive 428, and optical disc drive 430 are connected to the system bus 423 by a hard disk drive interface 432, a magnetic disk drive-interface 433, and an optical drive interface 434, respectively. The drives and their associated computer-readable media provide nonvolatile storage of computer-executable instructions, data structures, program modules and other data for the computer 420. Although the exemplary environment described herein employs a magnetic hard disk 439, a removable magnetic disk 429 and a removable optical disc 431, other types of computer readable media for storing data can be used, including magnetic cassettes, flash memory cards, digital versatile discs, Bernoulli cartridges, RAMs, ROMs, and the like.

Program code means comprising one or more program modules may be stored on the hard disk 439, magnetic disk 429, optical disc 431, ROM 424 or RAM 425, including an operating system 435, one or more application programs 436, other program modules 437, and program data 438. A user may enter commands and information into the computer 420 through keyboard 440, pointing device 442, or other input devices (not shown), such as a microphone, joy stick, game pad, satellite dish, scanner, or the like. These and other input devices are often connected to the processing unit 421 through a serial port interface 446 coupled to system bus 423. Alternatively, the input devices may be connected by other interfaces, such as a parallel port, a game port or a universal serial bus (USB). A monitor 447 or another display device is also connected to system bus 423 via an interface, such as video adapter 448. Video adapter 448 may include a graphics processor for performing certain graphics operations that would otherwise be performed by processing unit 421. In addition to the monitor, personal computers typically include other peripheral output devices (not shown), such as speakers and printers.

The computer 420 may operate in a networked environment using logical connections to one or more remote computers, such as remote computers 449a and 449b. Remote computers 449a and 449b may each be another personal computer, a server, a router, a network PC, a peer device or other common network node, and typically include many or all of the elements described above relative to the computer 420, although only memory storage devices 450a and 450b and their associated application programs 436a and 436b have been illustrated in FIG. 4. The logical connections depicted in FIG. 4 include a local area network (LAN) 451 and a wide area network (WAN) 452 that are presented here by way of example and not limitation. Such networking environments are commonplace in office-wide or enterprise-wide computer networks, intranets and the Internet.

When used in a LAN networking environment, the computer 420 is connected to the local network 451 through a network interface or adapter 453. When used in a WAN networking environment, the computer 420 may include a modem 454, a wireless link, or other means for establishing communications over the wide area network 452, such as the Internet. The modem 454, which may be internal or external, is connected to the system bus 423 via the serial port interface 446. In a networked environment, program modules depicted relative to the computer 420, or portions thereof, may be stored in the remote memory storage device. It will be appreciated that the network connections shown are exemplary and other means of establishing communications over wide area network 452 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising a trusted region of computer executable instructions that calls into an untrusted region of computer executable instructions to implement resource recovery from the untrusted region so as to enable continued execution of computer instructions in the trusted region without encountering potential inconsistencies introduced by recovering the resource from the untrusted region, the computing system comprising:
   a processor for processing computer-executable instructions;
   a trusted region of computer-executable instructions;
   an untrusted region of computer-executable instructions; and
   memory having stored therein computer-executable instructions for implementing a method comprising:
   wrapping one or more untrusted region entry points with exception logic for processing one or more exceptions that may be raised within the untrusted region;
   testing whether an exception has been raised within the untrusted region, and if not executing one or more computer executable instructions of the untrusted region that correspond to a specific entry point;
   blocking one or more resources from entering the untrusted region once an exception is raised in the untrusted region;
   storing a time element that indicates at least approximately how long the one or more computer executable instructions of the untrusted region that correspond to the specific entry point execute;
   setting a threshold execution time for the time element; and
   monitoring the time element at least periodically to determine if the threshold execution time for the time element has been reached.

2. The computing system recited in claim 1, wherein the time element and threshold execution time are based on central processing unit execution time.

3. The computing system recited in claim 1, wherein the resource comprises a thread.

4. The computing system recited in claim 3, wherein upon determining that the threshold execution time for the time element has been reached, the method further comprises acts of:
   blocking the thread;
   causing a particular exception to be raised within the thread;
   resuming execution of the thread; and
   executing the exception logic.

5. The computing system recited in claim 4, wherein the particular exception is raised within the thread by setting the thread's instruction pointer to a routine that raises the particular exception.

6. The computing system recited in claim 5, further comprising display hardware that includes a graphics processor and a central processing unit ("CPU"), and wherein reaching the threshold execution time for the time element indicates that the graphics processor has not completed a graphics command issued to the graphics processor, and wherein the method further comprises acts of:
   indicating that the particular exception has been raised in order to block other threads from entering the untrusted region; and
   changing display modes to allow the CPU to update the display hardware without using the graphics processor.

7. The computing system recited in claim 6, wherein the method further comprises an act of displaying an error message at the display hardware indicating that the graphics processor is not functioning and that the computer system should be restarted.

8. The computing system recited in claim 1, further comprising a central processing unit ("CPU"), and wherein at least a portion of the exception logic corresponds to one or more CPU generated exceptions.

9. The computing system recited in claim 1, wherein the trusted region of computer executable instructions corresponds to at least a portion of an operating system kernel, and wherein the untrusted region of computer executable instructions corresponds to at least a portion of a display hardware driver.

10. The computing system recited in claim 9, wherein the method further comprises acts of:
    retrieving the one or more untrusted region entry points from the display hardware driver;
    replacing the one or more untrusted region entry points with the wrapped one or more untrusted region entry points; and
    executing the one or more untrusted region entry points from the wrapped one or more untrusted region entry points.

11. A computing system comprising a trusted region of computer executable instructions that calls into an untrusted region of computer executable instructions to implement resource recovery from the untrusted region so as to enable continued execution of computer instructions in the trusted region without encountering potential inconsistencies introduced by recovering the resource from the untrusted region, the computing system comprising:
    a processor for processing computer-executable instructions;
    a trusted region of computer-executable instructions;
    an untrusted region of computer-executable instructions; and
    memory having stored therein computer-executable instructions for implementing a method comprising:
    calling one or more untrusted region entry points that are wrapped with exception logic for processing one or more exceptions that may be raised within the untrusted region;
    determining whether an exception has been raised within the untrusted region, and if not executing one or more computer executable instructions of the untrusted region that correspond to a specific entry point;
    preventing one or more resources from entering the untrusted region once an exception is raised in the untrusted region;
    recording a time element that indicates at least approximately an execution time for the one or more computer executable instructions of the untrusted region that correspond to the specific entry point; and determining if a threshold execution time for the time element has been reached.

12. The computing system recited in claim 11, wherein the time element and threshold execution time are based on central processing unit execution time.

13. The computing system recited in claim 11, wherein the resource comprises a thread.

14. The computing system recited in claim 13 wherein upon determining that the threshold execution time for the time element has been reached, the method further comprises steps for:

stopping thread execution;

raising a particular exception within the thread;

continuing thread execution; and processing the particular exception in accordance with the exception logic.

15. The computing system recited in claim 14, wherein the particular exception is raised within the thread by setting the thread's instruction pointer to a routine that raises the particular exception.

16. The computing system recited in claim 14, further comprising display hardware that includes a graphics processor and a central processing unit ("CPU"), and wherein reaching the threshold execution time for the time element indicates that the graphics processor has not completed a command issued to the graphics processor, and wherein the method further comprises steps for:

preventing other threads from entering the untrusted region; and updating the display hardware without using the graphics processor.

17. The computing system recited in claim 16, wherein the method further comprises a step for using the display hardware to indicate that the graphics processor is not functioning and that the computer system should be restarted.

18. The computing system recited in claim 11, wherein the computer system further comprises a central processing unit ("CPU"), and wherein at least a portion of the exception logic corresponds to one or more CPU generated exceptions.

19. The computing system recited in claim 11, wherein the trusted region of computer executable instructions corresponds to at least a portion of an operating system kernel, and wherein the untrusted region of computer executable instructions corresponds to at least a portion of a display hardware driver.

20. The computing system recited in claim 19, wherein the method further comprises steps for:

requesting the one or more untrusted region entry points from the display hardware driver;

substituting the wrapped one or more untrusted region entry points for the one or more untrusted region entry points; and calling the one or more untrusted region entry points from the wrapped one or more untrusted region entry points.

21. A computing system comprising a trusted region of computer executable instructions that calls into an untrusted region of computer executable instructions to implement resource recovery from the untrusted region so as to enable continued execution of computer instructions in the trusted region without encountering potential inconsistencies introduced by recovering the resource from the untrusted region, the computing system comprising:

a processor for processing computer-executable instructions;

a trusted region of computer-executable instructions, the trusted region of computer-executable instruction being associated with an operating system kernel;

an untrusted region of computer-executable instructions, the untrusted region of computer-executable instruction corresponding to computer-executable instruction provided by a third party; and memory having stored therein computer-executable instructions for implementing a method comprising:

wrapping one or more untrusted region entry points with exception logic for processing one or more exceptions that may be raised within the untrusted region;

testing whether an exception has been raised within the untrusted region, and in response to no exception being raised, executing one or more computer executable instructions of the untrusted region that correspond to a specific entry point;

in response to an exception being raised, blocking one or more resources from entering the untrusted region once an exception is raised in the untrusted region;

storing a time element that indicates at least approximately how long the one or more computer executable instructions of the untrusted region that correspond to the specific entry point execute;

setting a threshold execution time for the time element;

monitoring the time element at least periodically to determine if the threshold execution time for the time element has been reached;

determining that the threshold execution time for the time element has been reached;

blocking the resource;

causing a particular exception to be raised within the resource;

resuming execution of the resource; and executing the exception logic.

* * * * *